United States Patent
Thomas

(10) Patent No.: US 10,289,663 B2
(45) Date of Patent: *May 14, 2019

(54) METHOD AND SYSTEM FOR FORMATION OF ELECTRONIC DOCUMENTS

(71) Applicant: C. Douglass Thomas, Saratoga, CA (US)

(72) Inventor: C. Douglass Thomas, Saratoga, CA (US)

(73) Assignee: Robolaw Corporation, Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,889

(22) Filed: Jul. 31, 2014

(65) Prior Publication Data

US 2014/0344677 A1 Nov. 20, 2014
US 2018/0322105 A2 Nov. 8, 2018

Related U.S. Application Data

(60) Division of application No. 12/878,199, filed on Sep. 9, 2010, which is a continuation of application No.
(Continued)

(51) Int. Cl.
*G06F 17/24* (2006.01)
*G06Q 10/10* (2012.01)
*G06Q 40/00* (2012.01)
*G06F 17/27* (2006.01)
*H04L 29/08* (2006.01)
*G06F 16/955* (2019.01)

(52) U.S. Cl.
CPC .......... *G06F 17/24* (2013.01); *G06F 16/9566* (2019.01); *G06F 17/27* (2013.01); *G06Q 10/10* (2013.01); *G06Q 40/00* (2013.01); *H04L 67/10* (2013.01); *H04L 67/2823* (2013.01); *G06F 17/248* (2013.01); *Y10S 707/99943* (2013.01)

(58) Field of Classification Search
CPC ........ G06F 17/243; G06F 17/24; G06F 17/27; G06F 17/30887; G06Q 10/10
USPC .................................................. 715/221–226
See application file for complete search history.

(56) References Cited

U.S. PATENT DOCUMENTS 4,750,119 A 6/1988 Cohen et al.
5,253,165 A 10/1993 Leiseca et al.
(Continued)

FOREIGN PATENT DOCUMENTS

WO WO 97/04410 2/1997
WO WO 98/49644 11/1998

OTHER PUBLICATIONS

Notice of Allowance for U.S. Appl. No. 09/458,834 dated Jun. 21, 2004.
(Continued)

*Primary Examiner* — Howard Cortes

(57) ABSTRACT

A method and system for creation of customized documents over a network as well as for negotiation of contents for documents over a network (e.g., Internet) are disclosed. In one aspect, professional documents can be created in an automated manner. In another aspect, negotiation of documents (or their contents) can be performed in an automated manner. In either case, the customization and/or negotiation is efficient, cost-effective and useful.

46 Claims, 14 Drawing Sheets

Related U.S. Application Data

11/093,002, filed on Mar. 28, 2005, now Pat. No. 7,844,569, which is a continuation of application No. 09/458,834, filed on Dec. 13, 1999, now Pat. No. 6,873,992.

(60) Provisional application No. 60/112,234, filed on Dec. 14, 1998, provisional application No. 60/152,683, filed on Sep. 7, 1999.

(56) References Cited

U.S. PATENT DOCUMENTS

| | | | |
|---|---|---|---|
| 5,321,801 A * | 6/1994 | Ando | 715/205 |
| 5,535,383 A | 7/1996 | Gower | |
| 5,627,973 A | 5/1997 | Armstrong et al. | |
| 5,692,206 A * | 11/1997 | Shirley | G06F 17/2881 706/902 |
| 5,826,244 A | 10/1998 | Huberman | |
| 5,879,163 A * | 3/1999 | Brown et al. | 434/236 |
| 5,893,914 A * | 4/1999 | Clapp | G06F 17/243 715/205 |
| 5,897,646 A * | 4/1999 | Suda | G06F 17/243 434/156 |
| 5,918,222 A * | 6/1999 | Fukui | G06Q 10/10 |
| 5,987,480 A * | 11/1999 | Donohue et al. | 715/207 |
| 6,026,433 A | 2/2000 | D'Arlach et al. | |
| 6,067,531 A | 5/2000 | Hoyt et al. | |
| 6,081,262 A * | 6/2000 | Gill et al. | 715/202 |
| 6,182,095 B1 * | 1/2001 | Leymaster et al. | 715/236 |
| 6,192,380 B1 * | 2/2001 | Light | G06F 17/243 707/999.009 |
| 6,304,886 B1 * | 10/2001 | Bernardo et al. | 715/234 |
| 6,314,415 B1 | 11/2001 | Mukherjee | |
| 6,496,851 B1 | 12/2002 | Morris et al. | |
| 6,560,634 B1 | 5/2003 | Broadhurst | |
| 6,603,487 B1 * | 8/2003 | Bennett | G06Q 10/10 715/751 |
| 6,681,369 B2 | 1/2004 | Meunier et al. | |
| 6,684,188 B1 * | 1/2004 | Mitchell et al. | 705/3 |
| 6,684,369 B1 * | 1/2004 | Bernardo et al. | 715/205 |
| 6,873,992 B1 | 3/2005 | Thomas | |
| 7,051,364 B1 | 5/2006 | Tackman et al. | |
| 7,251,826 B1 | 7/2007 | Gardos et al. | |
| 7,844,569 B2 | 11/2010 | Thomas | |
| 2001/0011222 A1 | 8/2001 | McLaughlin et al. | |
| 2003/0115330 A1 * | 6/2003 | Kawakami | G06F 17/30896 709/227 |
| 2005/0102354 A1 | 5/2005 | Hollenbeck et al. | |
| 2005/0144323 A1 | 6/2005 | Gardos et al. | |
| 2010/0332974 A1 | 12/2010 | Thomas | |
| 2013/0198616 A1 | 8/2013 | Thomas | |

OTHER PUBLICATIONS

Office Action for U.S. Appl. No. 09/458,834 dated Feb. 23, 2004.
Advisory Action for U.S. Appl. No. 09/458,834 dated Jan. 15, 2004.
Office Action for U.S. Appl. No. 09/458,834 dated Aug. 22, 2003.
Office Action for U.S. Appl. No. 09/458,834 dated Feb. 10, 2003.
Notice of Allowance for U.S. Appl. No. 11/093,002 dated May 24, 2010.
Notice of Appeal filed Oct. 14, 2009 for U.S. Appl. No. 11/093,002.
Office Action for U.S. Appl. No. 11/093,002 dated Jul. 14, 2009.
Office Action for U.S. Appl. No. 11/093,002 dated Nov. 25, 2008.
Petition for review by Office of Petitions for U.S. Appl. No. 11/093,002 dated Apr. 18, 2008.
Notice of Abandonment for U.S. Appl. No. 11/093,002 dated Mar. 19, 2008.
Notice of Appeal Filed for U.S. Appl. No. 11/093,002 dated Oct. 26, 2007.
Office Action for U.S. Appl. No. 11/093,002 dated Jul. 30, 2007.
Office Action for U.S. Appl. No. 11/093,002 dated Mar. 8, 2007.
Restriction Requirement for U.S. Appl. No. 12/878,199 dated Jun. 21, 2012.
Office Action for U.S. Appl. No. 12/878,199 dated Aug. 20, 2012.
Final Office Action for U.S. Appl. No. 12/878,199 dated Dec. 12, 2012.
Examiner's Answer for U.S. Appl. No. 12/878,199, dated Aug. 2, 2013.
Fishman, Software Development: A Legal Guide, 2nd Edition, Nolo Press, Dec. 1998.
Negotiation over the Web, AIPLA Presentation, Oct. 1997.
Hollatz, "Neuro-fuzzy in Legal Reasoning, Fuzzy Systems," 1995, International Conference of the $4^{th}$ IEEE International Conference on Fuzzy Systems, Proceedings, vol. 2, pp. 655-662.
Ebenhoch, "Legal Knowledge Representation Using the Resource Description Framework (RDF), Database and Expert Systems Applications," 2001, pp. 369-373.
Ebenhoch, "Legal Citation Referencing Using SGML and HyTime, Database and Expert Systems Applications," 1998, pp. 625-630.
Using Computers to Realized Joint Gains in Negotiations: Toward an "Electronic Bargaining Table" Arvind Rangaswamy; G. Richard Shell, Management Science, vol. 43, No. 8 (Aug. 1997), pp. 1147-1163.
http://www.research.ibm.com./iac/reports-technical/inet98.pdf.
Negotiation by software agents in electronic marketplace; Murugesan, S.; TENCON 2000. Proceedings; vol. 2 Publication Year: 2000, pp. 286-279 vol. 2.
A Fuzzy Logic Based Intelligent Negotiation Agent (FINA) IN Ecommerce; Xin Wang; Xiaojun Shen; Georganas, N.D.; Electrical and Computer Engineering, 2006. CCECE'06. Canadian Conference on; Publication Year: 2006, pp. 276-279.
Negotiation modeling and e-shopping agents; Huang, R.: Computational Intelligence and Multimedia Applications, 2003. ICCIMA 2003. Proceedings. Fifth International Conference on Publication Year: 2003, pp. 3-10.
The Electronic Signatures in Global and National Commerce Act (ESIGN, Pub.L. 106-229,14 Stat. 464, enacted Jun. 30, 2000.
LegalDocs, Nov. 1999, http://web.archive.org/web/19991122201130/ http://legaldocs.com/ and http://web.archive.org/web/19991013005552/ htt://legaldocs.com/intro-s.htm, 2 pages.
Capsoft, HotDocs 5Features (Jul. 16, 1999), 55 pages.
Smartwords, The Technology Group (Apr. 13, 1999), 9 pages.
IQ DOCS, LLC, Intelligent Document Assembly, http://www.iqdocs.com/newscls.thm, (Apr. 14, 1999), 78 pages.
RobDocs, http://www.robdocs.com/LegalMatters.htm, Apr. 13, 1999, 9 pages.
Legal Expert Systems Limited, http://www.legal-expert.systems.com, Apr. 13, 1999, 16 pages.
Master Draft, http://www.masterdraft.com/software.htm, Apr. 13, 1999, 4 pages.
Appeal Brief for U.S. Appl. No. 12/878,199, dated Jul. 10, 2013.
Reply Brief for U.S. Appl. No. 12/878,199, dated Sep. 30, 2013.
Office Action for U.S. Appl. No. 13/801,854, dated Apr. 27, 2015.
Decision on Appeal for U.S. Appl. No. 12/878,199, dated Mar. 29, 2016.
Appeal Brief for U.S. Appl. No. 11/093,002, dated May 24, 2010.
Brief for the Director, CAFC Appeal No. 2017-1100, U.S. Appl. No. 11/093,002, May 4, 2017.

* cited by examiner

METHOD AND SYSTEM FOR FORMATION OF ELECTRONIC DOCUMENTS

CROSS-REFERENCE TO RELATED APPLICATIONS

This application is a divisional application of U.S. patent application Ser. No. 12/878,199, filed Sep. 9, 2010, and entitled "METHOD AND SYSTEM FOR FORMATION OF ELECTRONIC DOCUMENTS," the content of which is hereby incorporated by reference, which is a continuation application of U.S. patent application Ser. No. 11/093,002, filed Mar. 28, 2005, and entitled "METHOD AND SYSTEM FOR ELECTRONIC NEGOTIATION OF DOCUMENTS," the content of which is hereby incorporated by reference, which is a continuation application of U.S. patent application Ser. No. 09/458,834, filed Dec. 13, 1999, and entitled "METHOD AND SYSTEM FOR AUTOMATED DOCUMENT GENERATION," the content of which is hereby incorporated by reference, which claims the benefit of U.S. Provisional Application No. 60/112,234, filed Dec. 14, 1998, and entitled "METHOD AND SYSTEM FOR AUTOMATED DOCUMENT GENERATION," the content of which is hereby incorporated by reference, and which claims the benefit of U.S. Provisional Application No. 60/152,683, filed Sep. 7, 1999, and entitled "SYSTEM AND METHOD FOR ELECTRONIC FILING OF DOCUMENTS, PROVIDING AND UPDATING ON-LINE FORMS AND REGISTRATIONS, OR MONITORING DOMAINS", the content of which is hereby incorporated by reference.

BACKGROUND OF THE INVENTION

Field of the Invention

The present invention relates to document creation and, more particularly, to automated document generation.

Description of the Related Art

Various types of documents often need to be created for all types of uses. Many times the documents require careful wording for clarity or legal purposes. As an example, legal documents need to be carefully crafted to provide the legal protection sought. However, the creation of documents is largely still manually performed by skilled or experienced persons. There are many books and sample documents that can be found after some effort, but it is difficult to not only locate the appropriate samples or forms but also to complete or alter the samples or forms for a user's particular situation. There are difficulties in finding the appropriate form to utilize and then, if found, how to properly complete the form is very difficult.

Also documents, such as legal documents, are often negotiated using paper versions. The paper version are sent between parties or attorneys who negotiate certain portions of the documents until all terms are agreed to or the negotiation fails. The paper versions are sent by manual mail or facsimile. Recently, documents are have been transmitted electronically between parties or attorneys. Even still, the negotiation of the contents is not efficient, particularly in the nature which changes to provision are made.

Neither document creation through use of forms nor document negotiation are easily performed without expert assistance. In the case of legal documents, the expert assistance needed is provided by an attorney.

Thus, there is a need for improved approaches to create or negotiate documents in an efficient and simplified way without the need for expert assistance.

SUMMARY OF THE INVENTION

Broadly speaking, the invention relates to creation of customized documents over a network as well as for negotiation of contents for documents over a network. In one aspect of the invention, professional documents can be created in an automated manner. In another aspect of the invention, negotiation of documents (or their contents) can be performed in an automated manner. In either case, the customization and/or negotiation according to the invention is efficient, cost-effective and useful.

The invention can be implemented in numerous ways, including as a method, a computer system, an apparatus, and a computer readable media.

As a computer-implemented method for producing a customized document using a network, one embodiment of the invention can, for example, include at least: receiving, from a local machine, a customization request to customize a document template at a server machine, the server machine being coupleable to the local machine via the network; retrieving, at the server machine, an interview question set for the selected document template; sending the interview question set to the local machine where questions from the interview question set are able to be presented; receiving, at the server machine, answers to the questions of the interview question set; performing expert processes to produce a customized document based on the selected document template and the answers; and transmitting the customized document to the local machine or other machine via the network.

As a computer-implemented method for producing a customized document using a network, one embodiment of the invention can, for example, include at least: receiving a customization request for an electronic document, the customization request including or associating to customization data; determining a template document based on the customization request; obtaining a command set for use by an application program; and producing a customized electronic document from the template document in accordance with at least a portion of the customization data by using the command set operating on the application program.

As a method for enhancing functionality of a server coupled to a network, one embodiment of the invention can, for example, include at least: operating the server to receive a request for a file from a requestor; linking an application program to the web server; operating the application program in accordance with a command set to produce a processed file; and returning the processed file to the requestor.

The advantages of the invention are numerous. Different embodiments or implementations may yield one or more of the following advantages. One potential advantage of the invention is that document customization can be performed over a network using an automated system that is readily available whenever needed by a requestor. Another potential advantage of the invention is that negotiation of the contents of documents can be performed over a network in a manageable manner. Yet another potential advantage of the invention is that the document customization and/or negotiation can be centrally controlled and managed by a server machine. Still another potential advantage is the ability to produce professional quality documents in an efficient, cost-effective and automated way.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to an invention relates to creation of customized documents over a network as well as for negotiation of contents for documents over a network. The invention is able to perform the creation and/or negotiation in an automated manner such that the customization and/or negotiation is efficient, cost-effective and useful.

A first aspect of the invention pertains to the creation of customized documents over the Internet. The documents can be of a variety of types. One particular document type particularly suited for use with the first aspect of the invention are legal documents. Many documents have a legal character to them some include contracts, employment agreements, registration forms, license agreements, etc.

Figure 1A:
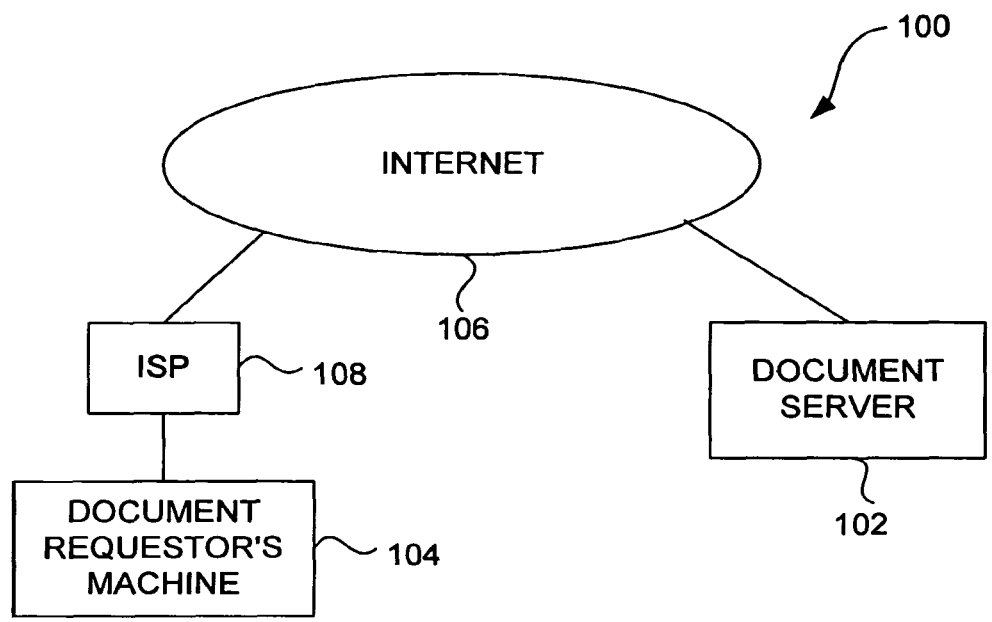
FIG. 1A is a block diagram of a document creation and delivery system according to one embodiment of the invention.

FIG. 1A is a block diagram of a document creation and delivery system 100 according to one embodiment of the invention. The document creation and delivery system 100 includes a document server 102 and a document requestor's machine 104. The document server 102 couples to the Internet 106, typically through a high speed data link. The document requestor's machine 104 typically couples to the Internet 106 through an Internet Service Provider (ISP) 108.

The ISP 108 typically connects to the Internet 106 using a high speed data link. Examples of high speed data links include T1, T4, ISDN or xDSL. The document requestor's machine 104 couples to the ISP 108 over a data link such as typically provided by the Public Service Telephone Network (PSTN). The data link can be provided in a wired or wireless manner. Generally speaking, the requestor will interact with the document requestor's machine 104 to request the creation and delivery of a specified document from the document server 102 to the document requestor's machine 104. The document server 102 will operate to question or interrogate the requestor through communications over the Internet 106 to obtain the information needed to produce the specified document. Once the document server 102 has sufficient information to produce the specified document, the document server 102 produces the specified document in a customized way for the requestor and then forwards the specified document that has been created to the document requestor's machine 104 through the Internet 106.

Figure 1B:
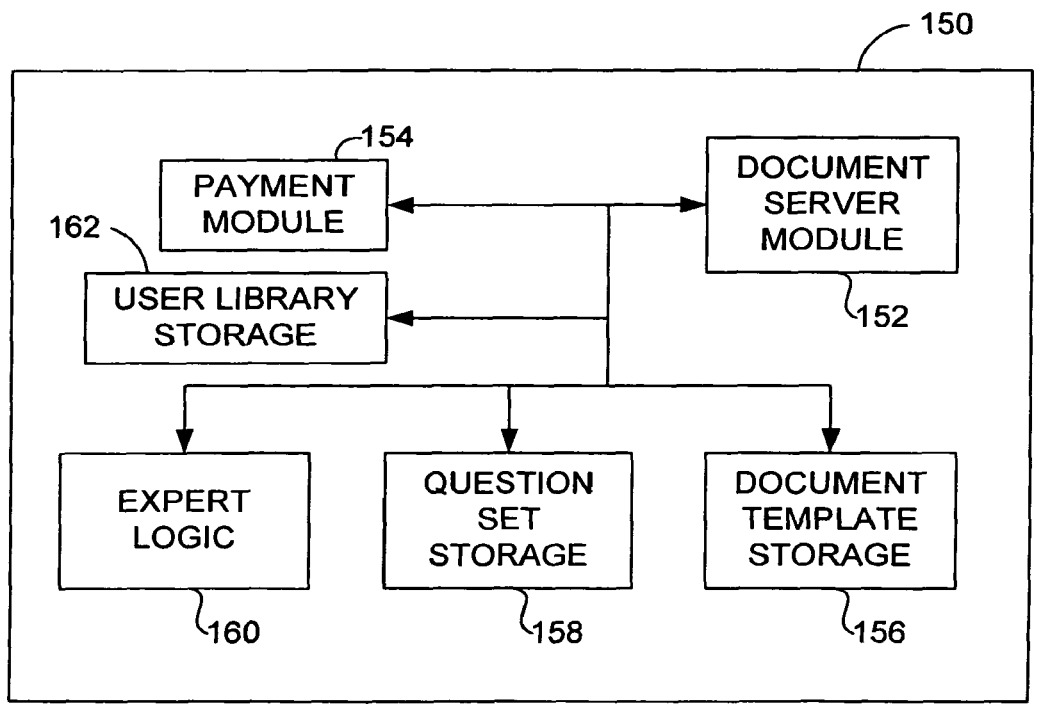
FIG. 1B is a block diagram of a document server according to one embodiment of the invention.

FIG. 1B is a block diagram of a document server 150 according to one embodiment of the invention. The document server 150 is, for example, suitable for use as the document server 102 illustrated in FIG. 1A. The document server 150 includes a document server module 152 that control the operation of the document server 150. The document server 150 also includes a payment module 154, a document template storage 156, a question set storage 158, expert logic 160, and user library storage 162. The payment module 154 is used to accept electronic payment for the production of a specified document in accordance with the invention. As an example, the electronic payment can be provided by accepting a credit card number and expiration date for the production of a specified document for a requestor. The document template storage 156 stores various document templates that are supported by the document server 150. The question set storage 158 stores the question sets for the various document templates stored in the document template storage. The expert logic 160 is provided and predetermined so that the document server 150 is able to automatically customize a particular document template in accordance with the answers to the particular question set. The expert logic and the question sets are specific to particular document templates. The user library storage 162 provides for storage for document storage that have been produced for subsequent usage or for storage of general information to minimize subsequent question sets or for archival purposes.

Figure 2:
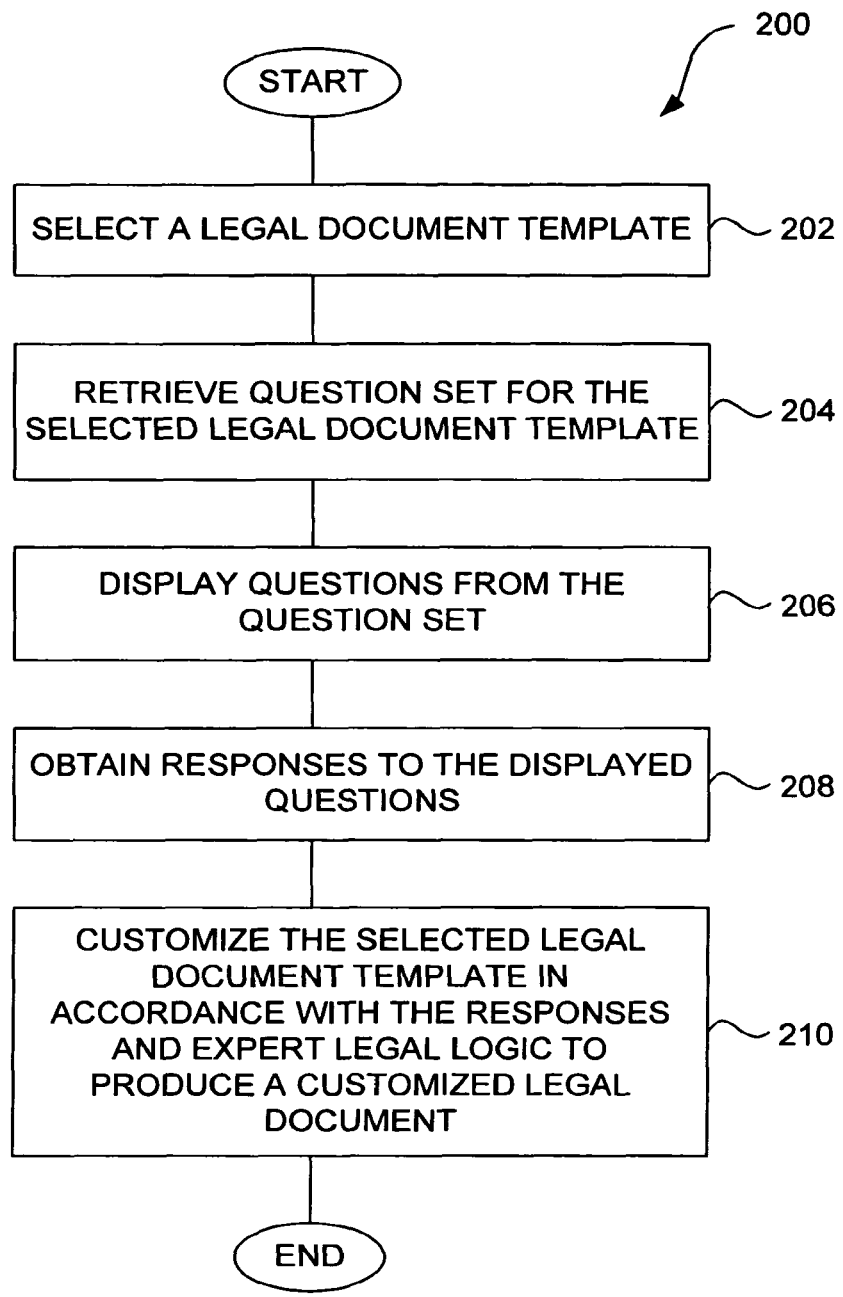
FIG. 2 is a flow diagram of document processing according to one embodiment of the invention.

FIG. 2 is a flow diagram of document processing 200 according to one embodiment of the invention. The document processing 200 is, for example, performed by the document requestor's machine 104 and the document server 102 illustrated in FIG. 1A. In this embodiment, the document being processed or produced is a legal document.

The document processing 200 initially selects a legal document template at block 202. The selected legal document template represents the type of legal document that the requestor desires to receive. Then, at block 204, a question set for the selected legal document template is retrieved. A question set is typically retrieved from a storage location associated with the document server 102 (e.g., question set storage 158). The question set is typically particular to the selected legal document template. Following block 204, the questions from the question set are displayed in block 206. Here, the display of the questions from the question set is on the document requestor's machine 104 so that the requestor (user) is able to understand the questions. Typically, the requestor would read the displayed questions; however, the questions could also be presented to the requestor in an audio or video manner. Next, at block 208, responses to the displayed questions are obtained. Here, the requestor responds to the questions as is appropriate. Then, at block 210, the selected legal document template is customized, in accordance with the responses that have been obtained and expert legal logic, to produce a customized legal document. The expert legal logic is associated with the selected legal document and is used to produced the customized legal document by selecting or producing appropriate language (i.e., text) for the customized legal document. Typically, the customization would be performed on the document server 102, which would thereafter forward the customized legal document to the document requestor's machine 104. Following block 210, the document processing 200 is complete and end.

The expert legal logic (expert knowledge) can be predetermined for the selected legal document template. Hence, the responses to the questions from the question set are used in accordance with the expert legal logic to make legal decisions about the content to be placed in the customized legal document. Hence, the expert legal logic can impact the particular paragraphs of text placed in (or removed from) the customized legal document as well as the particular verbiage used in the paragraphs.

Figure 3:
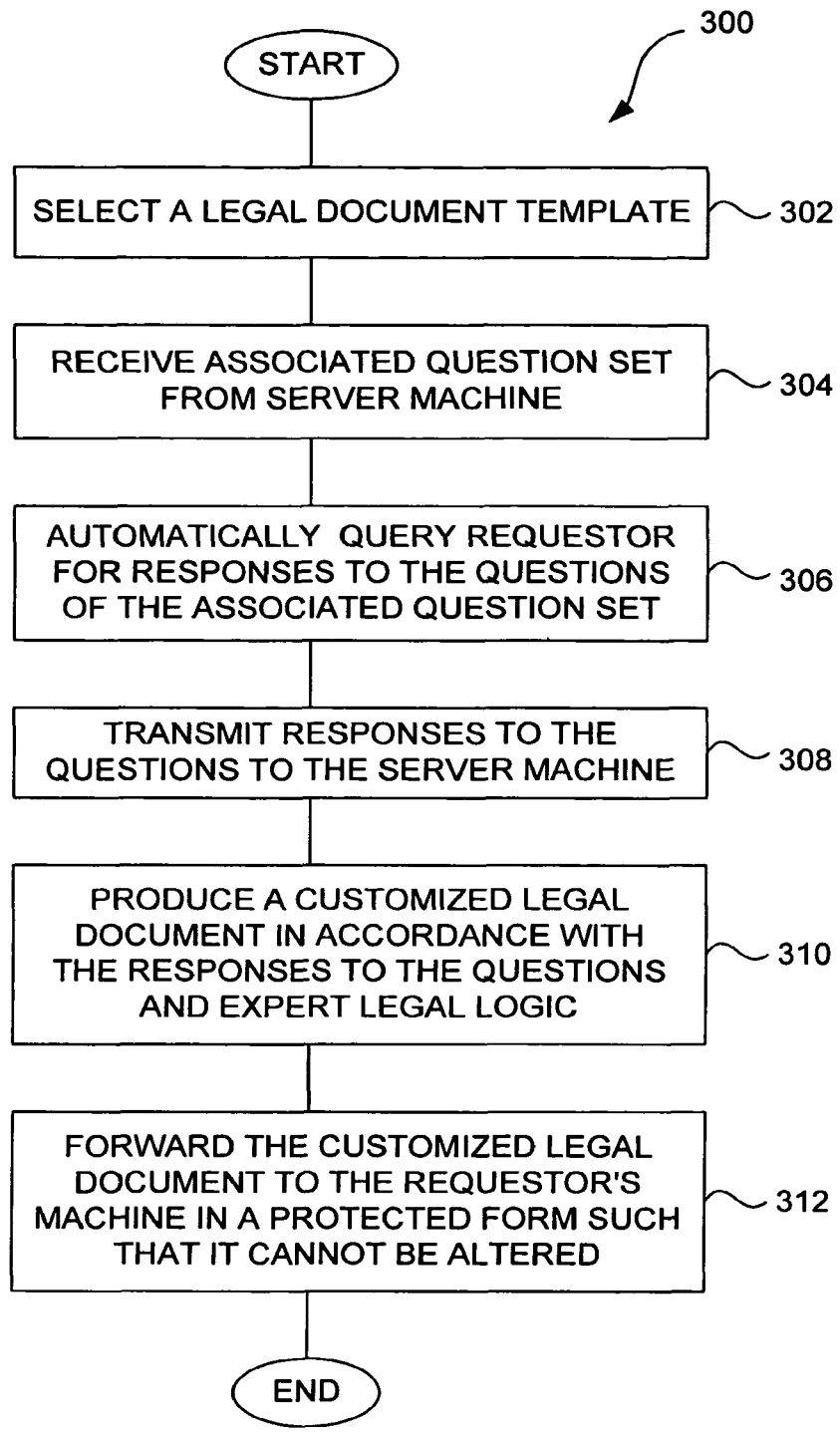
FIG. 3 is a flow diagram of document processing according to another embodiment of the invention.

FIG. 3 is a flow diagram of document processing 300 according to another embodiment of the invention. The document processing 300 is, for example, performed by the document requestor's machine 104 and/or the document server 102 illustrated in FIG. 1A. In this embodiment, the document being processed or produced is a legal document.

The document processing 300 initially selects the legal document template in block 302. Then, in block 304, an associated question set for the selected legal document template is received from a server machine. For example, the server machine can be the document server 102 illustrated in FIG. 1A or the document server 150 illustrated in FIG. 1B. Next, the requestor is automatically queried for responses to the questions of the associated question set in block 306. The presentation of the questions to the requestors can be controlled by the server machine or the client machine. In one implementation, the question set is a question and logic set because it includes not only questions but also logic. The question and logic set can allow for more sophisticated presentation of the questions to the requestor. For example, the sequence or ordering of the questions can be altered based on answers to previous questions and the logic. As another example, one or more questions can by skipped based on answers to previous questions and the logic. In general, the questions can appear differently to requestors depending on answers to previous questions and the logic. The logic within the question and logic set can also operate to reduce erroneous inputs. Preferably, the question set is not a mere form that the requestor completes on their own, but instead a sophisticated series of questions that guide the requestor in providing information needed so that expert legal logic can determine the appropriate text to provide in the customized legal document. In one implementation, one or more of the questions presents a predetermined list of acceptable or representative answers from which the user can choose.

In block 308, the responses to the questions are then transmitted to the server machine. Following block 308, a customized legal document is produced 310 in accordance with the responses to the questions and expert legal logic. Here, the customized legal document can be created by completing certain predefined areas in the legal document template or, instead, by producing the legal document (at least portions thereof) from the responses to the questions and the expert legal logic. In either case, the expert legal logic controls the content and verbiage of the customized legal document being produced. In one embodiment the expert legal logic is implemented by computer program code. Thereafter, the customized legal document is forwarded in block 312 to the requestor's machine in a protected form such that the customized legal document cannot be altered. In other words, the customized legal document can be displayed and printed by the requestor but its content cannot be edited or altered. Following block 312, the document processing 300 is complete and ends.

The document processing is typically performed by a combination of client-side processing and server-side processing. The client-side processing is performed on a client-side computer, such as the document requestor's machine 104 illustrated in FIG. 1A, and the server-side processing is, for example, performed by the document server 102 illustrated in FIG. 1A. The client-side computer and the server-side computer communicate through a network, such as the Internet 106 illustrated in FIG. 1A.

Figure 4A:
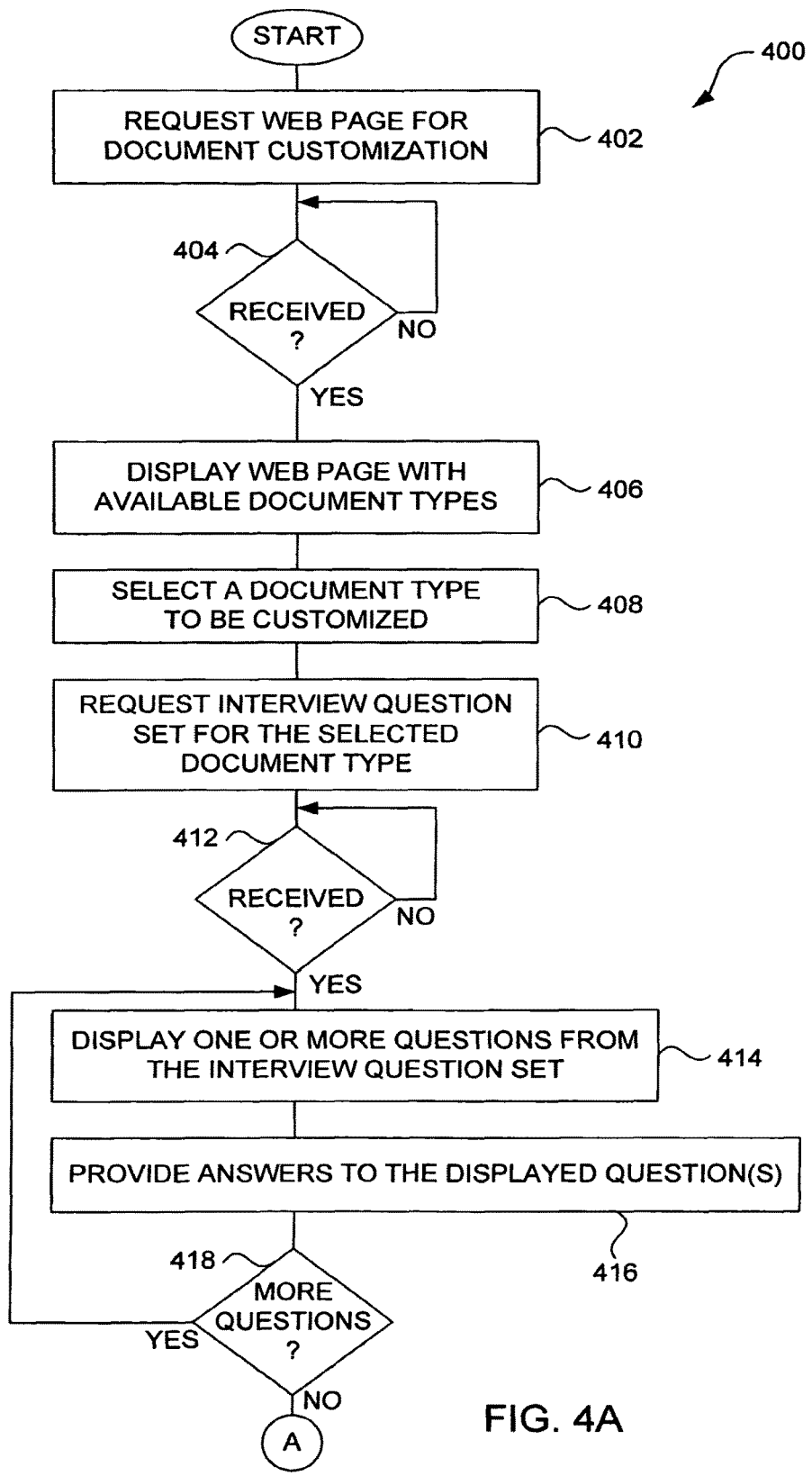
FIGS. 4A and 4B are flow diagrams of client-side document processing according to one embodiment of the invention.
Figure 4B:
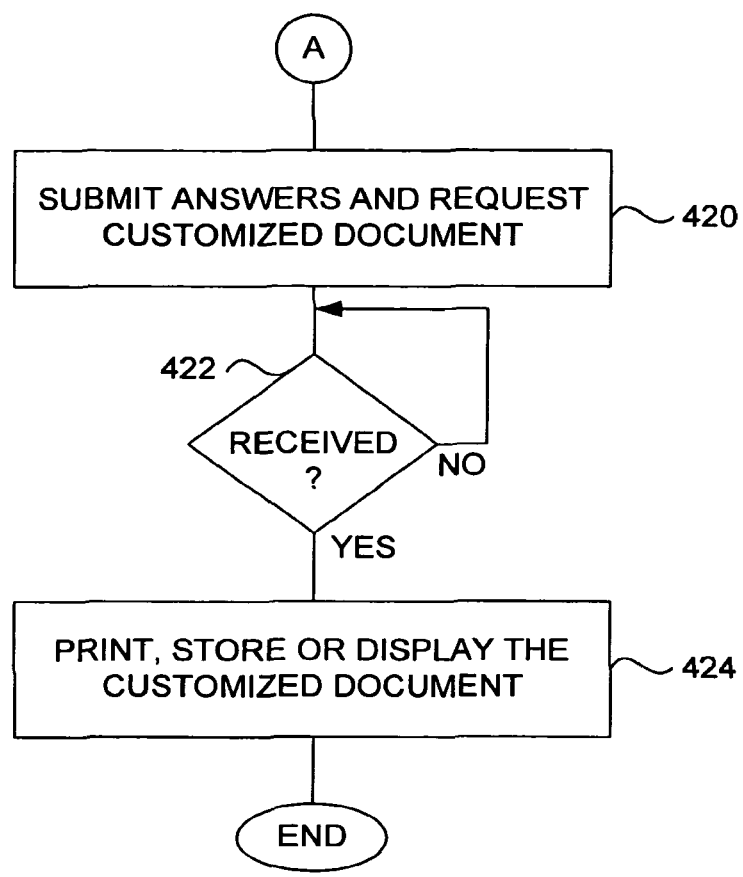

FIGS. 4A and 4B are flow diagrams of client-side document processing 400 according to one embodiment of the invention. The client-side document processing 400 initially requests a web page for document customization in block 402. Here, the requestor will direct a network browser to a particular web page that is designed to perform document customization. Next, at decision block 404, the client-side document processing 400 determines whether a response to the request for the web page has been received. When the requested web page has not yet been received, the client-side document processing 400 awaits the reception of the requested web page. Once the requested web page has arrived, the web page is displayed at block 406. Here, the web page being displayed contains available document types. The available document types associated with the web page can be provided, displayed or presented in a variety of different ways. One way the document types can be provided is in a list which may or may not be categorized into different types or groupings. Another way the document templates can be provided is through the use of a document selection wizard (search assistant) that would assist the requestor in locating a particular document type for a specific document that is desired. In one implementation, the document types are templates.

Next, in block 408, a document type to be customized is selected. An interview question set for the selected document type is then requested in block 410. At this point, the client-side document processing 400 waits for the arrival of the interview question set. In block 412, the client-side document processing 400 determines whether the interview question set has been received. As long as the interview question set has not yet been received, the client-side document processing 400 repeats the block 412.

Once the client-side document processing 400 receives the interview question set, one or more of the questions from the interview question set are displayed at block 414. Then, answers to the displayed one or more questions are provided in block 416. Here, the requestor will interact with the requestor's machine (e.g., via network browser) to provide the answers to the one or more questions associated with the interview question set that are displayed. Next, in block 418, a determination of whether there are more questions in the interview question set to be processed. When the block 418 determines that there are more questions to be processed, the client-side document processing 400 returns to repeat the block 414 and subsequent blocks.

On the other hand, when the decision block 418 determines that there are no more questions to be processed, the answers to the interview questions are submitted to the server machine along with a request for the customized document in block 420. Then, the client-side document processing 400 awaits the reception of the customized document at block 422.

Once the customized document has been received from the server machine, the customized document can be printed, stored or displayed at block 424. Typically, the customized document will not be able to be altered, edited or otherwise changed so that the integrity of the document is preserved, and the document is not inappropriately used in the future for another different situation than the one it was originally intended. One way to provide the locked or unalterable format is in a portable document form (e.g., pdf) with the content protected so it is unalterable. Additionally, by preventing the customized document from being altered, edited or otherwise changed, the web site providing the document customization is more likely revisited the next time the requestor needs a document supported by the document processing system. Following block 424, the client-side document processing 400 is complete and ends.

Figure 5:
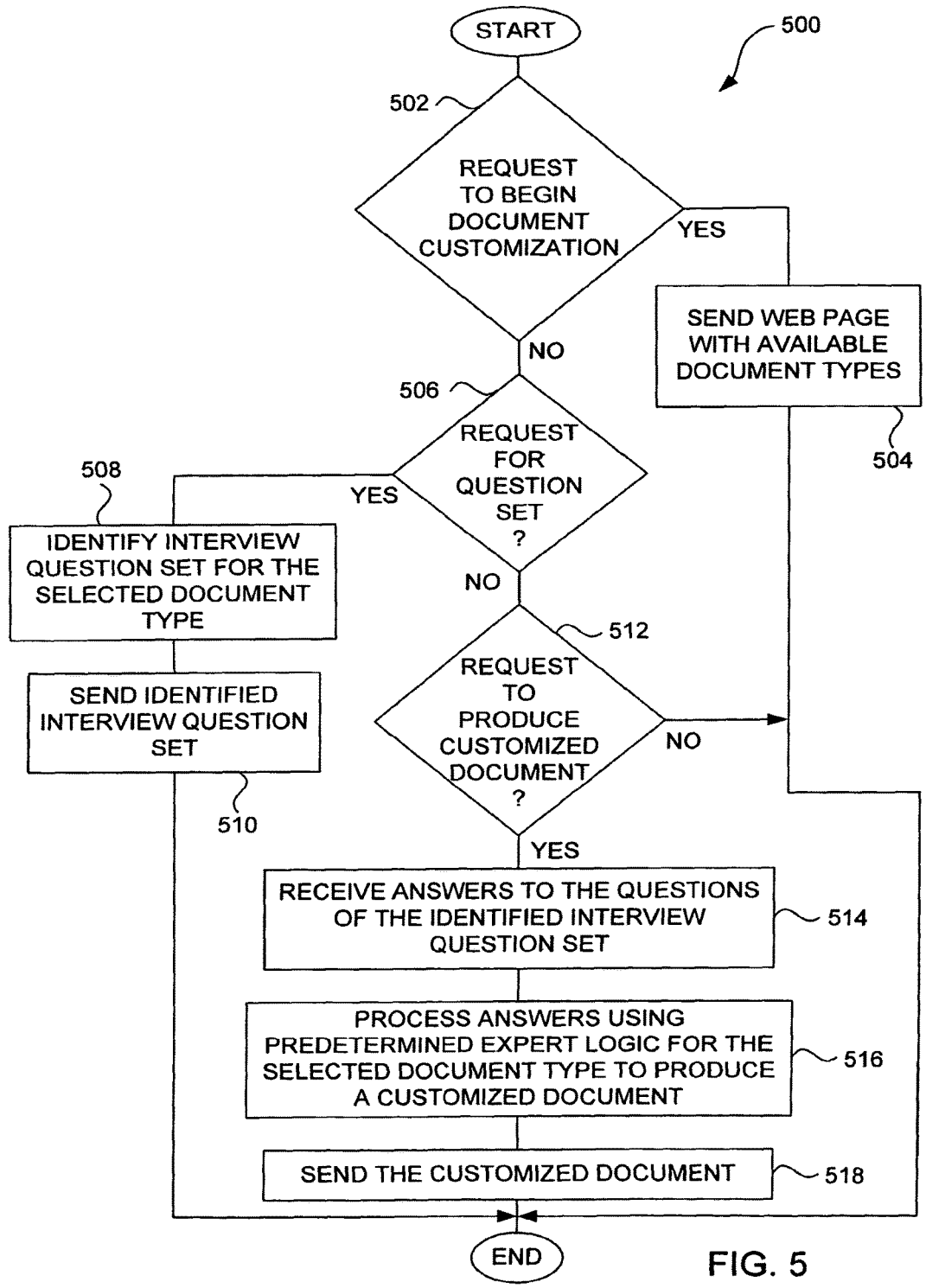
FIG. 5 is a flow diagram of server-side document processing according to one embodiment of the invention.

FIG. 5 is a flow diagram of server-side document processing 500 according to one embodiment of the invention. The server-side document processing 500 begins with a decision block 502 that determines whether the incoming request to the server machine is a request to begin document customization. When the incoming request is determined to be a request to begin document customization at block 502, then a web page with available document types is sent to the requestor's machine in block 504. Following block 504, the server-side document processing 500 is complete and ends.

On the other hand, when the incoming request is not a request to begin document customization, a decision block 506 determines whether the incoming request is a request for a question set. When the decision block 506 determines that the incoming request is a request for a question set, then an interview question set for the selected document type is identified in block 508. Then, following block 508, the identified interview question set is sent 510 to the requestor's machine. Following block 510, the server-side document processing 500 is complete and ends.

Alternatively, when the incoming request is neither a request to begin document customization nor a request for a question set, a decision block 512 determines whether the incoming request is a request to produce a customized document. When the decision block 512 determines that the incoming request is a request to produce a customized document, then answers to the questions of the identified interview question set are received at block 514. In one implementation, the answers to the questions of the identified interview question set can be provided together with the request to produce the customized document. In another implementation, the answers to the questions of the identified interview question set are separately sent to the server machine. Next, the answers that have been received can be processed using predetermined expert logic for the selected document type to produce a customized document in block 516. The customized document is then sent to the requestor's machine that block 518. Following block 518, the server-side document processing 500 is complete and ends.

Additionally, in the situation in which the incoming request is determined in the block 512 not to be a request to produce a customized document, the server-side document processing 500 is also complete and ends. In this case, the receive request is assumed to be unrelated to the document processing according to the invention. However, the server machine can service a variety of other types of requests and support other functionality as understood by those skilled in the art.

Figure 6:
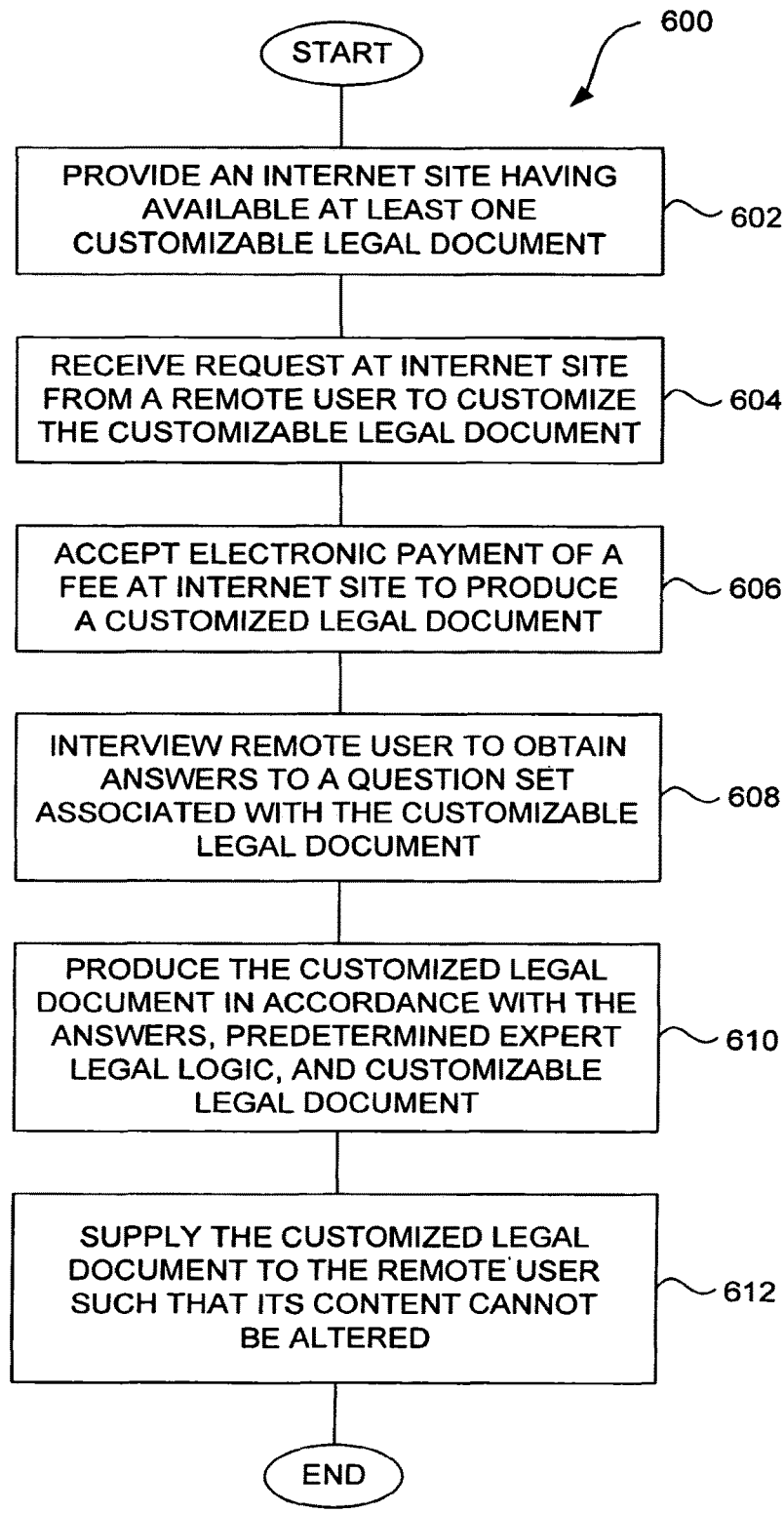
FIG. 6 is a flow diagram of document creation and delivery business processing.

FIG. 6 is a flow diagram of document creation and delivery business processing. The document creation and delivery business processing 600 is, for example, suitable as a method for doing business over the Internet or other type of network that supports a variety of users.

The document creation and delivery business processing 600 begins by providing an Internet site having available at least one customizable legal document at block 602. After the Internet site is provided and made available, eventually a request will be received at the Internet site from a remote user requesting to customize the customizable legal document at block 604. Next, electronic payment of a fee to produce a customized legal document can be accepted at the Internet site at block 606. Then, the remote user that has requested the creation of the customized legal document is interviewed at block 608 to obtain answers to a question set associated with the customizable legal document. Thereafter, the customized legal document is produced in block 610. The customized legal document is produced in accordance with the answers to the questions of the question set, predetermined expert legal logic, and the customizable legal document itself. Once the customized legal document is produced, the customized legal document is supplied to the remote user at block 612 such that its content cannot be altered. In other words, the customized legal document that is delivered to the remote user enables the user to view, print and store the customized legal document but does not permit the remote user to thereafter edit or alter the customized legal document. By not permitting the customized legal document that is provided to the remote user to be altered, the document creation and delivery business processing 600 encourages its remote users to revisit the Internet site when other supported legal documents are needed. It also discourages its remote users from later misusing the customized legal document for different situations. Following the block 612, the document creation and delivery business processing 600 is complete and ends.

Further, the invention can be provided as a document processing system in which a web server automatically utilizes an application program (such as a word processing application) to produce a customized document. The web server activates the application program (e.g., word processor, spreadsheet or database program) to produce the customized document by executing a macro or embedded program. Typically, application programs like word processor, spreadsheet or database programs support macros and some further support embedded programs. For example, Microsoft Word, Excel and Access, for example, all support macros and/or embedded programs. With Microsoft, the embedded programs are based on Visual Basic and often referred to as Visual Basic Applications (e.g., VBA). In any case, by activating the application program and the macro or embedded program, the web server can produce a customized document. In one implementation, the customized document is produced by customizing a template document. The customization can, if desired, utilize computer implemented expert logic and requestor's answers to various questions as noted above. Hence, the web server's functionality is able to be enhanced with the functionality of existing application programs and macro or embedded programs that operate therein.

Figure 12:
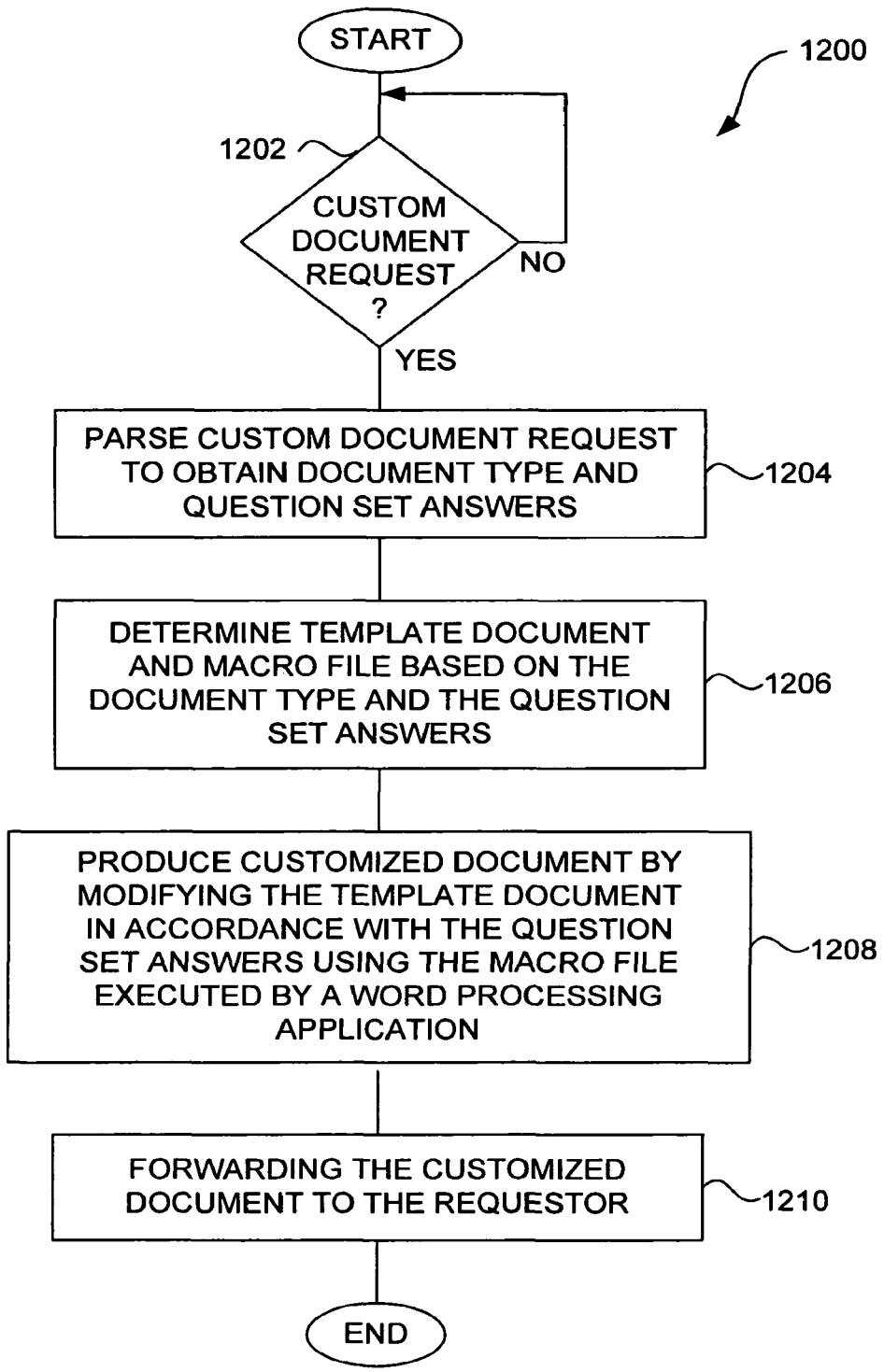
FIG. 12 is a flow diagram of document customization processing according to one embodiment of the invention.

FIG. 12 is a flow diagram of document customization processing 1200 according to one embodiment of the invention. The document customization processing 1200 pertains to an embodiment in which a macro within a word processing application is used, though as noted above embedded programs within application programs could also be used. The document customization processing 1200 is, for example, performed on the document server 102 of FIG. 1 which can operate as a web server.

The document customization processing 1200 begins with a decision 1202 that determines whether a custom document request has been received. In one implementation, the custom document request is provided from a network browser operating on a user machine that couples to the web server over a network (e.g., the Internet). When the decision 1202 determines that a custom document request has not yet been received, the document customization processing 1200 awaits the reception of the custom document request. Once the decision 1202 determines that a custom document request has been received, the custom document request is parsed 1204 to obtain document type and question set answers. More generally, the question set answers contain customization information used to produce the customized document. Typically, the customization information (e.g., question set answers) is provided by a user using the network browser. Next, a template document and a macro file are determined 1206 based on the document type and the question set answers. The macro file could alternatively be an embedded program. The customized document is then produced 1208 by modifying the template document in accordance with the question set answers using the macro file executed by a word processing application. In other words, the word processing application (or other application programs) produce the customized document. The word processing application can operate on the web server or another computing machine coupled thereto. After the customized document is produced 1208, the customized document is forwarded 1210 to the requestor. Optionally, the customized document can be provided in an unalterable format. Following block 1210, the document customization processing 1200 is complete and ends.

An additional feature of the invention can optionally provide document packages instead of single documents to a requestor. These document packages can group several customizable documents which are often needed by requestors at about the same time. In such a case, the question set can be efficiently used for multiple documents that are within a document package. The customized documents provided by the document package are able to be delivered to the requestor as a document package. The document packages can be for lots of different circumstances. One example of a document package is a new employee legal document package. Such a new employee legal document package might, for example, include an employment contract, invention agreement, tax withholding form, and company policies. Another example of a document package is a departing employee legal package. Yet another example of a document package is a stockholder's legal package. Such a stockholder's legal package might, for example, include a stockholder's agreement, a disclosure or registration statement document, and a right of first refusal agreement. Still another example of a document package is a software development package. Such a software development package might, for example, include a software development agreement, software specification document, and copyright assignment.

Yet another feature of the invention is to optionally provide for library storage for requestors. Requestors who foresee reusing the document creation system of the invention can be provided with a virtual library where they can store the documents they previously created or descriptive information about the requestor. The document creation system can then make use of the information stored in the library storage by reducing the number of questions in the question set and thus reducing the interaction required with the requestor to produce subsequent document. The library storage provided by the virtual library can act as a document archive for requestors, and thus facilitate retrieval of copies of documents previously created using the document creation system. An example of the library storage is the user library storage 162 illustrated in FIG. 1B.

Still another feature of the invention is that the system can also provide a certification indication for the resulting documents that have been created. In one implementation, the certification is formed in and becomes part of the resulting document. Preferably, the certification would be done in the server machine. The certification can serve as an indication that the document creation system was used to create the document in a fair manner. Alternatively or additionally, the certification can indicate the relative balance of rights in the resulting document or provide a power rating. For example, a high power rating can mean that the document favors its creator, a neutral power rating can indicate that the document is largely neutral and a low power rating can indicate that the document disfavors its creator. The certification can indicate relative balance of rights or power rating in many ways, such as numerically (e.g., 1-10) or graphically through a scale or bar graph. One particular implementation of a scale graph is where each side of the scale graph represents a party to the customized legal document, and the relative heights of the side of the scale graph indicate the relative advantages the customized legal document offers to the party associated with the higher height of the side of the scale graph.

A second aspect of the invention pertains to the negotiation of the contents of documents. The documents can be of a variety of types. One particular document type particularly suited for negotiation of its content are legal documents. The second aspect can be used alone or together with the first aspect of the invention.

Figure 7A:
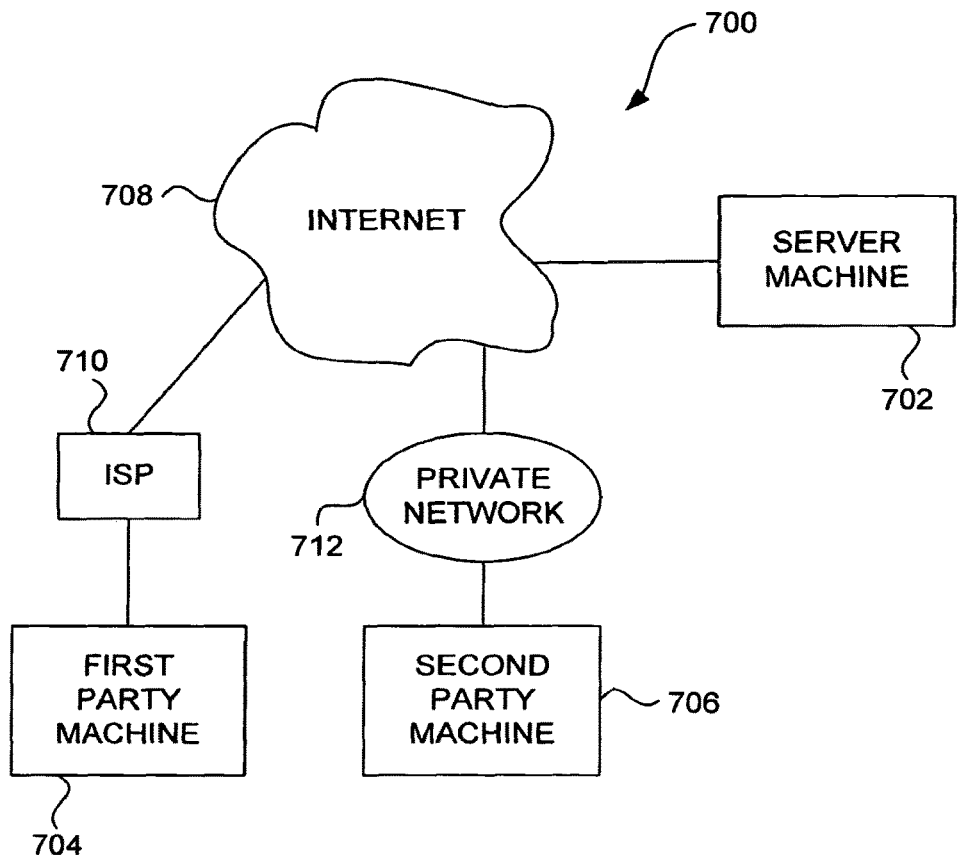
FIG. 7A is a block diagram of a document negotiation system according to one embodiment of the invention.

FIG. 7A is a block diagram of a document negotiation system 700 according to one embodiment of the invention. The document negotiation system 700 includes a server machine 702, a first party machine 704 and a second party machine 706. The first and second parties are parties to a document that is negotiated between the first and second parties and controlled by the server machine 702. The server machine 702 provides automated management of the negotiated contents of the document. The first party machine 704 and the second party machine 706 communicate with the server machine 702 through the Internet 708. The first party machine 704 couples to the Internet 708 through, for example, an Internet Service Provider (ISP) 710. The second party machine 706 couples to the Internet 708 through, for example, a private network 712.

Figure 7B:
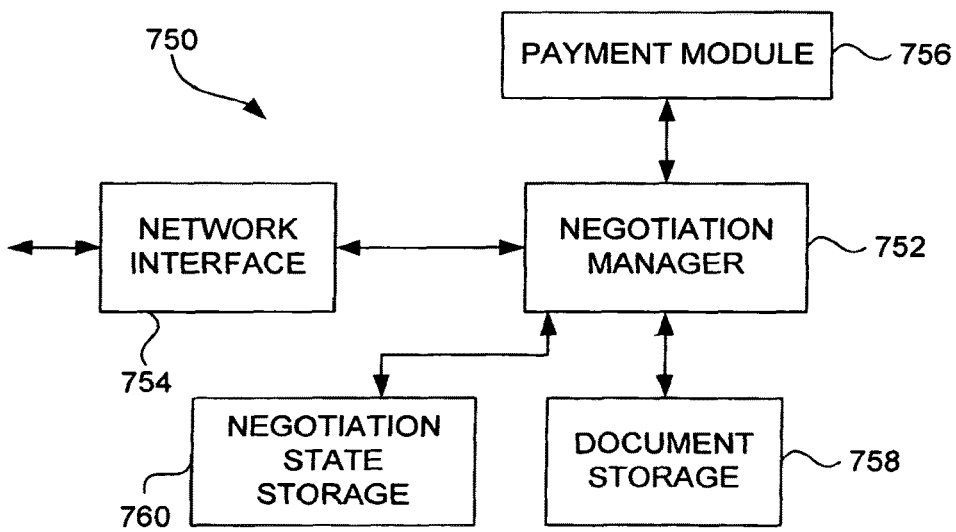
FIG. 7B is a block diagram of a server machine that manages document negotiation for the document negotiation system according to one embodiment of the invention.

FIG. 7B is a block diagram of a server machine 750 that manages the document negotiation for a document negotiation system according to one embodiment of the invention. The server machine 750 is, for example, suitable for use as the server machine 702 illustrated in FIG. 7A. The server machine 750 includes a negotiation manager 752 that manages the negotiation of the document contents through communications with first and second parties. The negotiation manager 752 couples to a network interface 754 to facilitate the communications with the first and second parties over a network (e.g., Internet 708). A payment module 756 provides processing that enables a requestor to provide electronic payment for the use of the document negotiation system. A document storage 758 provides for storage of the documents being negotiated. A negotiation state storage 760 can provide storage of information describing the negotiation state for a particular document. For example, the negotiation state information can include provisions agreed to, provisions not agreed to, information on parties, party due to respond, etc.

Figure 8:
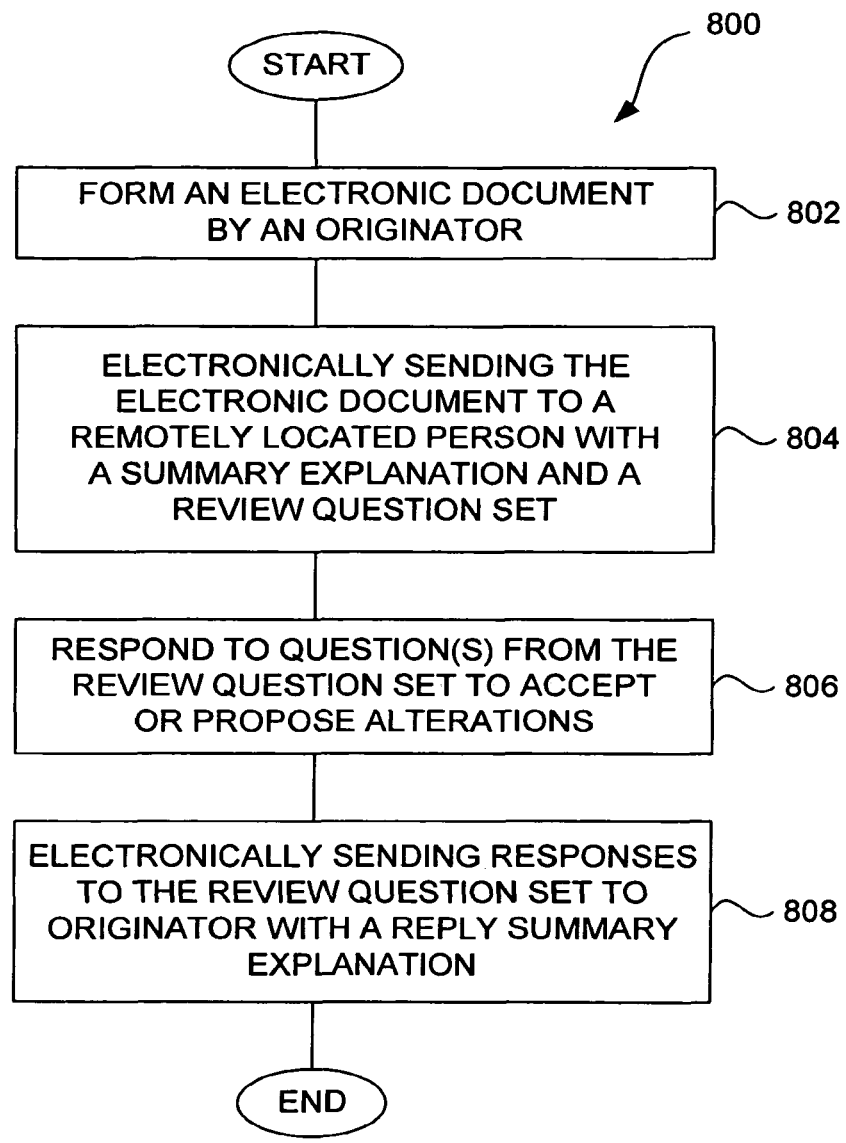
FIG. 8 is a flow diagram of electronic negotiation processing according to one embodiment of the invention.

FIG. 8 is a flow diagram of electronic negotiation processing 800 according to one embodiment of the invention. The electronic negotiation processing 800 can, for example, be performed by the document negotiation system 700 illustrated in FIG. 7A.

The electronic negotiation processing 800 initially forms an electronic document in block 802. The electronic document is formed by an originator of the electronic document. Here, the electronic document can be merely retrieved from a storage location or the electronic document can be actually created from a template or otherwise (such as using techniques discussed above with respect to the first aspect, for example). Next, the electronic document is electronically sent to a remotely located person with a summary explanation and a review question set at block 804.

The originator thus creates or selects the electronic document, and then the electronic document is sent to the remotely located person. The remotely located person is then asked to accept the contents of the electronic document in its current state or provide alterations to the content of the electronic document. To facilitate the remotely located person's understanding of the electronic document, the summary explanation explains the general outline of the provisions of the electronic document. The summary explanation is particularly useful for those not skilled in the area to understand the provisions of the electronic document. The review question set are questions that are presented to the remotely located person to facilitate their review of the electronic document.

Next, responses to the questions from the review question set are obtained from the remotely located person at block 806. These responses are generally associated with whether the remotely located person accepts the contents of the electronic document or what proposed alterations the remotely located person has for the electronic document.

Then, in block 808, the responses to the review question set are electronically sent to the originator together with a reply summary explanation. Here, the reply summary explanation indicates the extent to which the remotely located person has consented to the content of the electronic document. For example, the remotely located person could accept the electronic document as it was prepared by the originator or can accept a portion of the electronic document and request that certain alterations be made. Following block 806, the electronic negotiation processing 800 is complete and ends. However, it should be noted that additional processing can occur to alter the electronic document in accordance with the responses from the remotely located person or to partially or completely deny the proposed alterations (by originator) and respond back electronically to the remotely located person. Thus, the processing can continue such that the electronic document is reviewed by the parties until entirely accepted or one party breaks off negotiations.

FIGS. 9-11B are flow diagrams that pertain negotiation processing between first and second parties with use of a negotiation manager (negotiation server) according to the invention.

Figure 9:
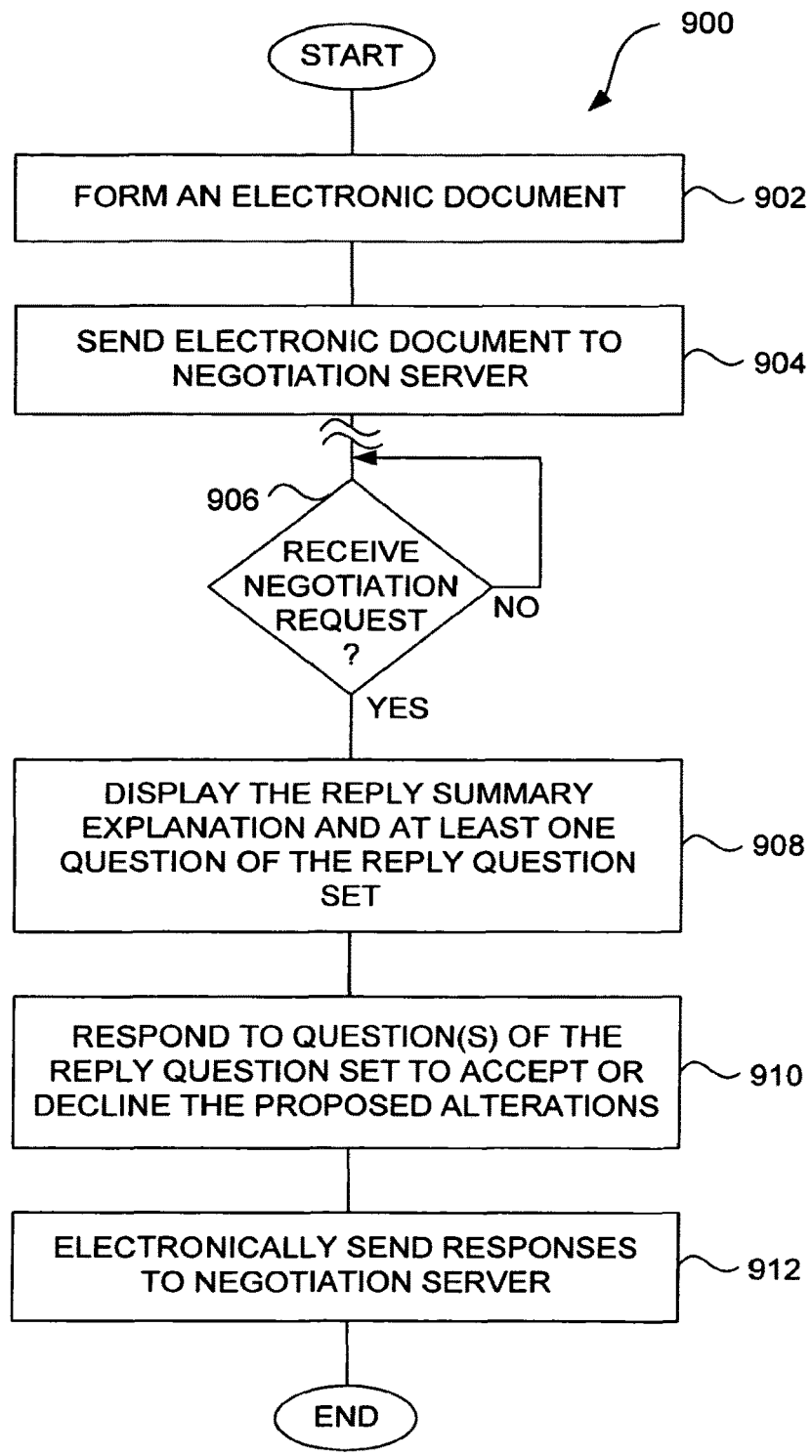
FIG. 9 is a flow diagram of first party processing according to one embodiment of the invention.

FIG. 9 is a flow diagram of the first party processing 900 according to one embodiment of the invention. The first party processing 900 is, for example, the processing performed by the first party machine 704 illustrated in FIG. 7A.

The first party processing 900 initially forms an electronic document at block 902. In one embodiment, the electronic document can be formed in accordance with the first aspect of the invention. In other embodiment, the electronic document can be formed by retrieval from a storage device or creation using a word-processing program. Then, at block 904, the electronic document is sent to the negotiation server. Here, the electronic document is sent to the negotiation server for delivery to the second party.

At this point, the first party processing 900 can operate to form and send out other electronic documents or receive a negotiation request from the second party that is responsive to the electronic document that the negotiation server sent to the second party. To form and send out other electronic documents, blocks 902 and 904 can be repeated.

A decision block 906 causes the first party processing 900 to await the reception of a negotiation request. In other words, when the decision block 906 determines that a negotiation request has been received from the negotiation server, additional processing is invoked or can be invoked. It is understood that in this embodiment the negotiation request will include some sort of summary explanation together with a reply question set. In block 908, the reply summary explanation and at least one question of the rely question set are displayed for the first party. Here, the reply summary explanation and the at least one question are displayed on a display device associated with the first party machine. Next, the first party responds to questions of the reply question set in block 910. The responses to the questions enable the first party to easily accept or decline a proposed alteration to the content of the electronic document. Next, the responses are electronically sent to the negotiation server at block 912. Following block 912, the first party processing 900 is complete and ends.

Figure 10:
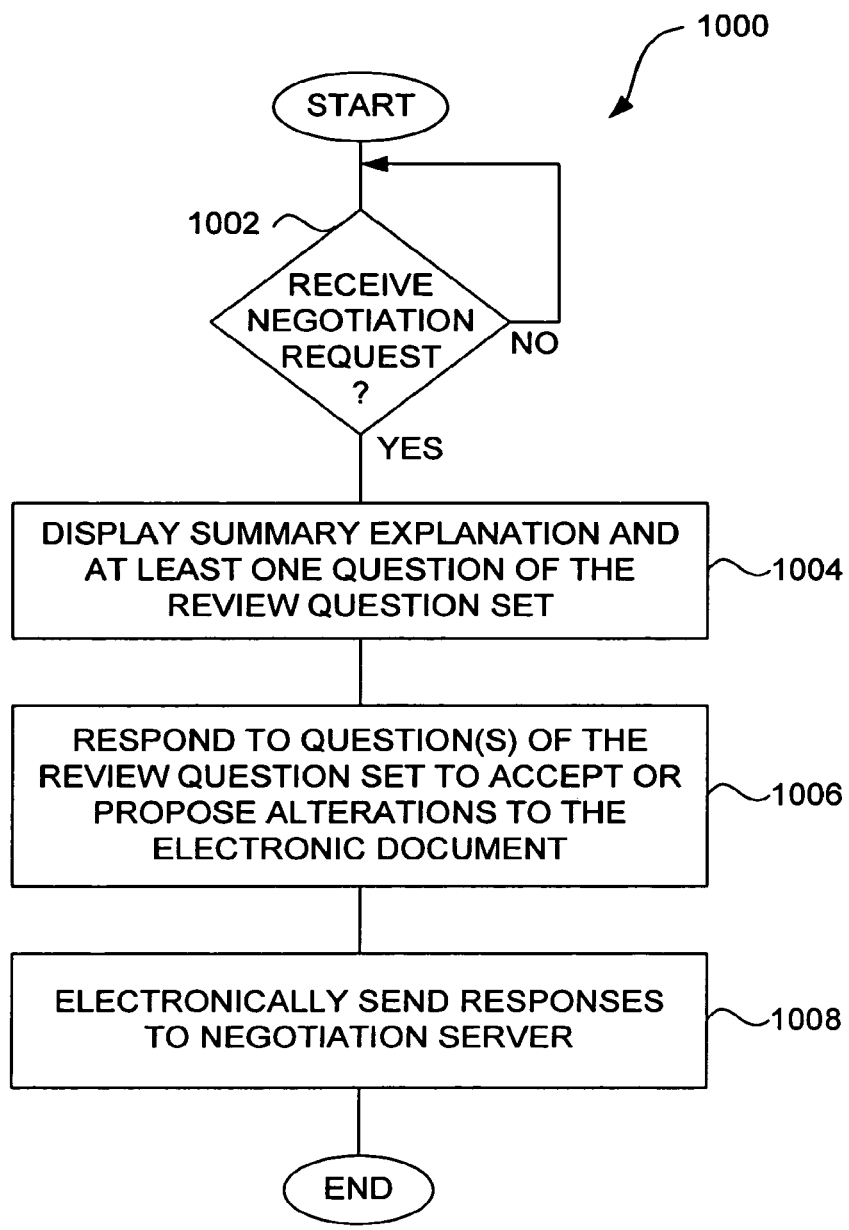
FIG. 10 is a flow diagram of second party processing according to one embodiment of the invention.

FIG. 10 is a flow diagram of second party processing 1000 according to one embodiment of the invention. The second party processing 1000 is, for example, performed by a second party machine, such as the second party machine 706 illustrated in FIG. 7A.

The second party processing 1000 begins by determining whether a negotiation request has been received at block 1002. As long as a negotiation request has not been received, the second party processing 1000 is essentially inactive. Once a negotiation request has been received, the second party processing 1000 is invoked or can be invoked. Once invoked, a summary explanation and at least one question of the review question set are displayed at block 1004. Here, the summary explanation and the at least one question of the review question set are displayed on a display device associated with the second party machine. Then, responses to the questions of the review question set are obtained in block 1006. These responses enable the second party to either accept, decline or propose alterations to the contents of the electronic document. After the responses are obtained, the responses are electronically sent to the negotiation server at block 1008. Following block 1008, the second party processing 1000 is complete and ends.

Figure 11A:
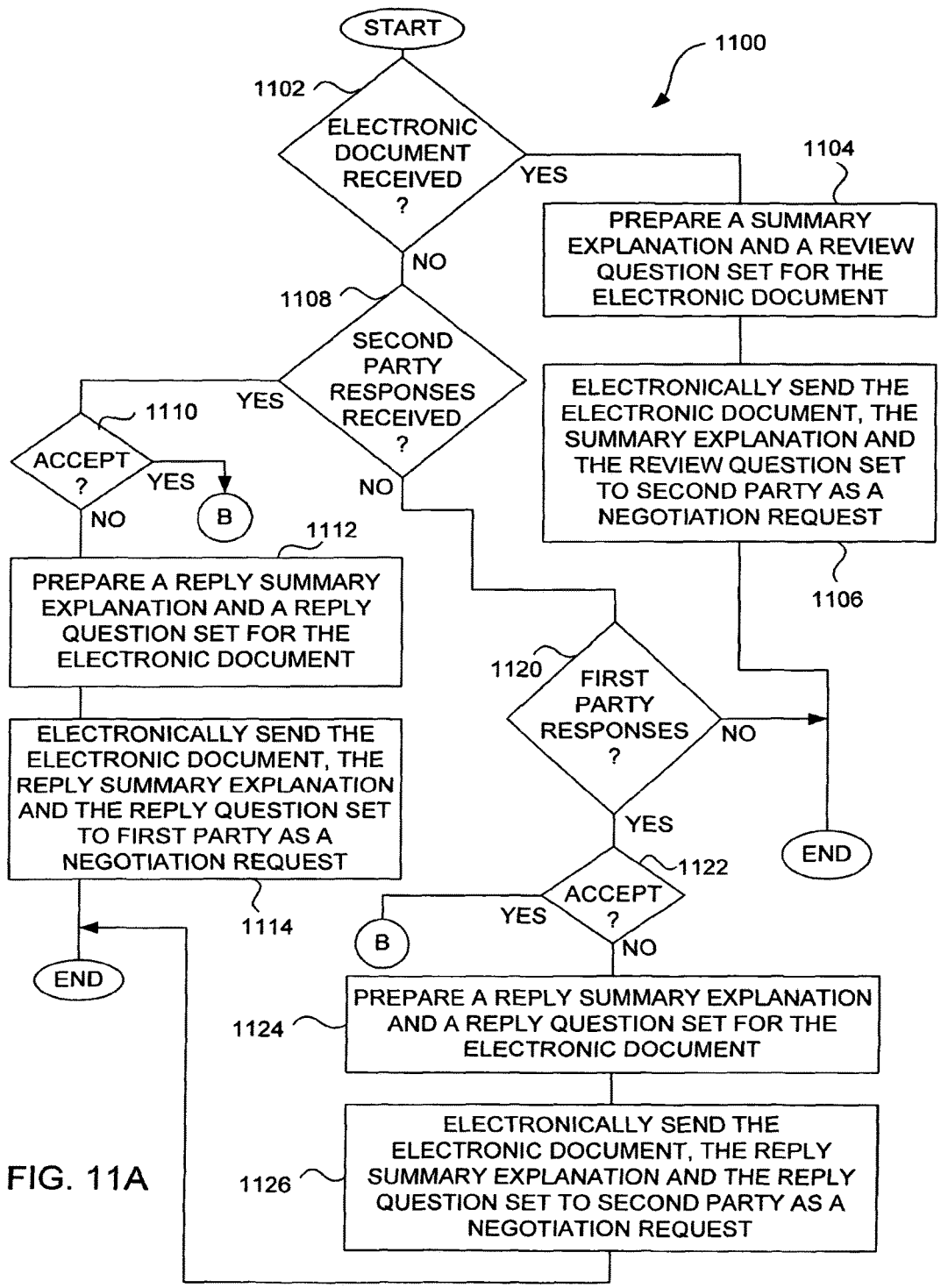
FIGS. 11A and 11B are flow charts of negotiation server processing according to one embodiment of the invention.
Figure 11B:
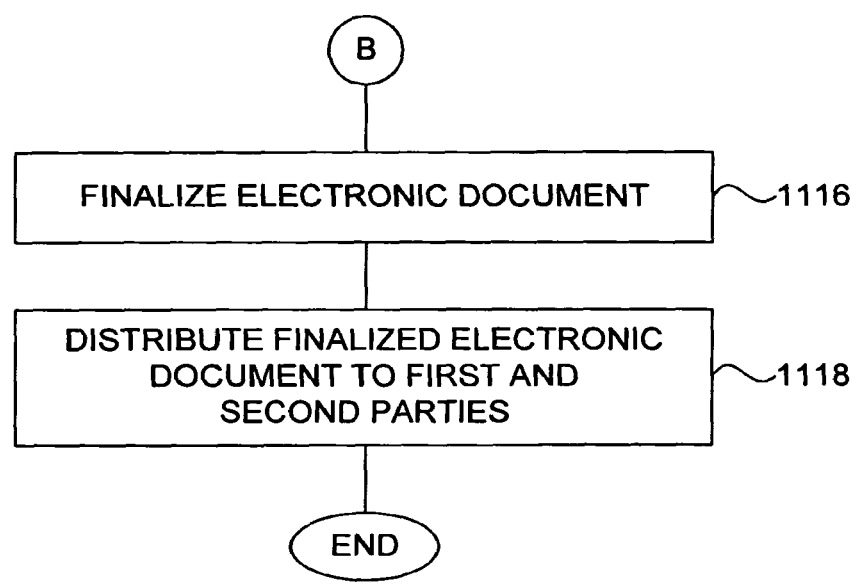

FIGS. 11A and 11B are flow charts of negotiation server processing 1100 according to one embodiment of the invention. The negotiation server processing 1100 is, for example, performed by the server machine, such as the server machine 702 illustrated in FIG. 7A.

The negotiation server processing 1100 begins with a decision block 1102 that determines whether an electronic document has been received. When an electronic document has been received, the negotiation server processing 1100 operates to initiate a negotiation session between the first party and the second party. Here, it is assumed that the electronic document has only two parties to the document. However, it should be understood that with documents having additional parties, the negotiation processing according to the invention can interact with more than two parties. In any case, when the decision block 1102 determines that an electronic document has been received for negotiation processing, a summary explanation and a review question set are prepared for the electronic document at block 1104. In an implementation where the electronic document is created using the first aspect of the invention, the summary explanation and the review question set are, as an example, able to be predetermined or automatically determined from codes accompanying or embedded in the electronic document. Then, at block 1106, the electronic document, the summary explanation and the review question set are electronically sent to the second party as a negotiation request. Following block 1106, the negotiation server processing 1100 is finished processing the electronic document that has been received and thus awaits additional requests. However, the server machine records the state and contents of the electronic document for subsequent use.

On the other hand, when the decision block 1102 determines that an electronic document has not been received, a decision block 1108 determines whether second party responses have been received. When the decision block 1108 determines that second party responses have been received, a decision block 1110 determines whether the second party has accepted the current contents of the electronic document. When the decision block 1110 determines that the second party has not accepted the contents of the electronic document, then the negotiation server processing 1100 continues to negotiate the electronic document. Namely, a reply summary explanation and a reply question set are prepared for the electronic document at block 1112. Here, the reply summary explanation and the reply question set are determined in accordance with the second party responses. In one implementation, the reply summary explanation and the reply question set are, as an example, predetermined or automatically determined from the second party responses as well as the state and contents of the electronic document. Then, at block 1114, the electronic document, the reply summary explanation and the reply question sent are electronically set to the first party as a negotiation request. In this case, the second party has not accepted the contents of the electronic document, but has proposed alterations to the electronic document. Hence, the first party is notified of the proposed alterations that the second party has requested in the negotiation request. Following block 1114, the negotiation server processing 1100 is complete and ends as the request including the second party responses has been fully processed.

Alternatively, when the decision block 1110 determines that the second party responses indicate that the second party has accepted the contents of the electronic document, then the negotiation of the contents for the electronic document is completed. Hence, the electronic document is then finalized at block 1116. Thereafter, the finalized electronic document is distributed to the first and second parties at block 1118. In one implementation, the finalized electronic document is sent to the first and second parties in a locked or unalterable format such that the parties can view, read or print but not edit or alter the finalized electronic document. One way to provide the locked or unalterable format is in a portable document form (e.g., pdf) with the content protected so it is unalterable. Following block 1118, the negotiation server processing 1100 is complete and ends as the negotiation has been completed and the electronic document has been finalized.

On the other hand, when the decision block 1108 determines that the incoming request does not include second party responses, a decision block 1120 determines whether the incoming request includes first party responses. When the decision block 1120 determines that the incoming request does not include first party responses, then the negotiation server processing 1100 is complete and ends. Alternatively, when the decision block 1120 determines that the incoming request does include first party responses, then the negotiation server processing 1100 performs the following operations. Initially, a decision block 1122 determines whether the first party responses indicate that the first party has accepted the current contents of the electronic document. If so, the processing associated with blocks 1116 and 1118 is performed as discussed above. On the other hand, when the first party responses indicate that the first party has not accepted the contents of the electronic document, then a reply summary explanation and a reply question set for the electronic document are prepared at block 1124. Then, the electronic document, the reply summary explanation and the reply question set are electronically sent to the second party as a negotiation request in block 1126. In one implementation, the reply summary explanation and the reply question set are, as an example, predetermined or automatically determined from the first party responses as well as the state and contents of the electronic document. Following block 1126, the negotiation server processing 1100 is complete and ends.

The communications with the parties negotiating the electronic document can be through a variety of mediums. For example, the communications can be through electronic mail or the parties can interact with a web site supporting the document negotiation system. In the case of the web site implementation, electronic mail, paging or telephone can signal a party to access the web site for further negotiating of the electronic document. The communications with the parties can also be protected (or made secure) through password requirements and/or encryption schemes.

While the document negotiation system described above uses a negotiation server in some embodiments, the system can also operate without a server be providing additional processing at the client side. One advantage of a server based design is that the client side can be "thin" clients, such as a network browser (e.g., HTML browser).

A further feature of the invention is that signatures can be electronically attached to the finalized electronic document. The electronic signature can be a bitmap image of a party's signature or instead just a "click acceptance" effective signature. Another feature is that the document negotiation system can provide for document archival. In the event of a dispute as to the document's execution (signature) or contents in the future, the document could be retrieved from the document negotiation system. Also the document's creation history could also be archived for subsequent retrieval in the event of a dispute.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations may yield one or more of the following advantages. One potential advantage of the invention is that document customization can be performed over a network using an automated system that is readily available whenever needed by a requestor. Another potential advantage of the invention is that negotiation of the contents of documents can be performed over a network in a manageable manner. Yet another potential advantage of the invention is that the document customization and/or negotiation can be centrally controlled and managed by a server machine. Still another potential advantage is the ability to produce professional quality documents in an efficient, cost-effective and automated way.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A server machine configured to produce a customized legal document, said server machine couples to a network, said server machine comprising:
    a memory that stores expert processes; and
    at least one processor configured to:
        receive, from a local machine via the network, a customization request to customize a selected document template for a legal document at said server machine;
        retrieve an interview question set for the selected document template, the interview question set being retrieved from a group of question sets that are predetermined and the interview question set being retrieved is associated with the selected document template;
        send the interview question set to the local machine via the network where questions from the interview question set are able to be presented via the local machine;
        receive, from the local machine via the network, answers to the questions of the interview question set;
        perform one or more of the expert processes to produce a customized legal document based on the selected document template and the answers to the questions of the interview question set, the expert processes are implemented by computer program code which when performed controls content and verbiage of at least a portion of the customized legal document being produced, the customized legal document being an electronic document; and
        after the customized legal document has been produced, electronically transmit the customized legal document to the local machine or other machine via the network,
    wherein the selected document template is used at said server machine to produce the customized legal document, and wherein the customized legal document is electronically transmitted to the local machine or other machine after the answers to the questions of the interview question set for the selected document template have been received at said server machine.

2. A server machine as recited in claim 1, wherein the customized legal document has a non-editable format, such that when received from the server machine, the customized legal document is useable but not alterable.

3. A server machine as recited in claim 1, wherein at least one the answers are used to select from available alternative portions associated with the selected document template.

4. A server machine as recited in claim 1,
    wherein the selected document template to be customized corresponds to a document package, and
    wherein the expert processes operate to produce a plurality of related customized documents based on the selected document package and the answers.

5. A server machine as recited in claim 1, wherein presentation of at least one of the questions from the interview question set via the local machine is dependent on predetermined logic associated with the interview question set, and wherein the predetermined logic impacts sequencing or ordering of at least one of the questions from the interview question set.

6. A server machine as recited in claim 1, wherein presentation of at least one of the questions from the interview question set via the local machine is dependent on predetermined logic associated with the interview question set, and wherein the predetermined logic impacts skipping of at least one of the questions from the interview question set.

7. A server machine as recited in claim 1, wherein the local machine is associated with a requestor, and wherein presentation of at least one of the questions from the interview question set via the local machine differs for different requestors dependent on predetermined logic associated with the interview question set, and wherein the predetermined logic impacts skipping or ordering of at least one of the questions from the interview question set.

8. A server machine as recited in claim 1,
    wherein the selected document template pertains to a plurality of different electronic documents, and
    wherein the at least one processor is configured to performs the one or more of the expert processes to produce a set of customized electronic documents from the selected document template and the responses to the interview question set, the customized electronic documents including at least the customized legal document.

9. A server machine as recited in claim 1, wherein the server machine includes or couples to a user storage library, and
    wherein the user storage library stores the previously produced customized legal documents for a given user as well as other information previously acquired from the given user, and wherein the at least one processor is further configured to remove one or more questions from the interview question set for the selected document template that are to be presented via the local machine through use of the information stored in the user storage library for the given user.

10. A server machine as recited in claim 9, wherein the at least one processor is further configured to:

access at least a portion of the other information previously acquired from the given user and stored in the user storage library corresponding to the given user, and reduce required interaction with the given user via the local machine to produce the customized legal document via the interview question set for the selected document template through use of at least a portion of the other information stored in the user storage library for the given user.

11. A server machine as recited in claim 1, wherein, due to predetermined associations, the selected document template has a corresponding interview question set for the selected document template and also has corresponding expert processes for use with the selected document template.

12. An electronic document generation system for producing customized documents using a network, said electronic document generation system comprising:

a document template storage to store a plurality of document templates;

a question set storage to store a plurality of question sets that are associated with the document templates;

an expert logic storage to store expert processes associated with the document templates; and a document server machine configured to:

receive, from a user machine via the network, a customization request to customize a selected document template at the document server;

identify an interview question set for the selected document template from the plurality of question sets stored in the question set storage, the interview question set being identified is associated with the selected document template, wherein different ones of the document templates have different ones of the interview question sets associated therewith;

retrieve the interview question set for the selected document template;

send the interview question set to the user machine via the network where questions from the interview question set are able to be presented via the user machine;

receive, from a user machine via the network, answers to the questions of the interview question set;

perform one or more of the expert processes to produce a customized legal document based on the selected document template and the answers to the questions of the interview question set, the expert processes are implemented by computer program code which when performed controls content and verbiage of at least a portion of the customized legal document being produced; and after the customized legal document has been produced, electronically transmit the customized legal document to the user machine or other machine via the network, wherein the selected document template is used at said document server machine to produce the customized legal document, and wherein the customized legal document is electronically transmitted to the local machine or other machine after the answers to the questions of the interview question set for the selected document template have been received at said document server machine.

13. An electronic document generation system as recited in claim 12, wherein the customized legal document is a completed electronic form.

14. An electronic document generation system as recited in claim 12, wherein the customization request is initiated by a requestor, and wherein said electronic document generation system comprises:

sending the customized legal document to the requestor via the network.

15. An electronic document generation system as recited in claim 12, wherein the customization request is initiated by a requestor, and wherein the answers to the interview question set result from answers by the requestor to the interview question set.

16. An electronic document generation system as recited in claim 12, wherein different ones of the document templates have different ones of the interview question sets corresponding thereto.

17. An electronic document generation system as recited in claim 12, wherein the customized legal document has a non-editable format, such that the customized legal document is an non-alterable format.

18. An electronic document generation system as recited in claim 12, wherein the customization request is initiated by a requestor, and wherein the answers to the interview question set result from answers by the requestor to the interview question set, and wherein different ones of the template documents have different ones of the interview question sets corresponding thereto.

19. An electronic document generation system as recited in claim 18, wherein the selected document template pertains to a plurality of different electronic documents, and wherein said document server performs the one or more of the expert processes to produce a set of customized electronic documents from the selected document template and the responses to the interview question set, the customized electronic documents including at least the customized legal document.

20. An electronic document generation system as recited in claim 12, wherein the selected document template and the associated interview question set pertains to a plurality of different electronic documents, and wherein said document server machine performs the one or more of the expert processes to produce a plurality of customized electronic documents from the selected document template and the responses to the interview question set, the customized electronic documents including at least the customized legal document and another customized legal document.

21. An electronic document generation system as recited in claim 20, wherein at least one the answers are used to select from available alternative portions associated with the selected document template.

22. An electronic document generation system as recited in claim 12, wherein the selected document template to be customized corresponds to a document package, and wherein the expert processes operate to produce a plurality of related customized legal documents based on the document package and the answers.

23. An electronic document generation system as recited in claim 22, wherein the selected document template and the associated interview question set pertains to a plurality of different electronic legal documents, and wherein said document server machine performs the one or more of the expert processes to produce the plurality of electronic legal documents from the selected document template and the answers to the interview question set, the plurality of different electronic legal documents including at least the customized legal document and another customized legal document.

24. An electronic document generation system as recited in claim 23, wherein at least one the answers are used to select from available alternative portions associated with the selected document template.

25. An electronic document generation system as recited in claim 23, wherein, due to predetermined associations, the selection of the selected document template from the document template storage not only selects the selected document template but also identifies the interview question set for the selected document template that is to be retrieved and also the expert processes for use with the selected document template.

26. An electronic document generation system as recited in claim 23, wherein the electronic document generation system comprises:
a user library storage to store the customized legal document that has been produced such that the electronic document generation system archives previously produced customized legal documents for a given user such that the given user is able to later retrieve copies of the previously produced customized legal documents for the given user.

27. An electronic document generation system as recited in claim 26, wherein the user library storage stores the previously produced customized legal documents for a given user as well as other information previously acquired from the given user, and wherein the document server machine of the electronic document generation system is further configured to reduce required interaction with the given user with respect to the interview question set through use of the information stored in the user storage library for the given user.

28. An electronic document generation system as recited in claim 26, wherein the user library storage stores the previously produced customized legal documents for a given user as well as other information previously acquired from the given user, and wherein the document server machine of the electronic document generation system is further configured to remove or omit one or more questions from the interview question set for the selected document template that are to be presented via the user machine through use of the information stored in the user library storage for the given user.

29. An electronic document generation system as recited in claim 12, wherein, due to predetermined associations, the selection of the selected document template from the document template storage not only selects the selected document template but also identifies the interview question set for the selected document template that is to be retrieved and also the expert processes for use with the selected document template.

30. An electronic document generation system as recited in claim 12, wherein the electronic document generation system comprises:
a user library storage to store the customized legal document that has been produced such that the electronic document generation system archives previously produced customized legal documents for a given user such that the given user is able to later retrieve copies of the previously produced customized legal documents for the given user.

31. An electronic document generation system as recited in claim 30, wherein the user library storage stores the previously produced customized legal documents for a given user as well as other information previously acquired from the given user, and wherein the document server machine of the electronic document generation system is further configured to reduce required interaction with the given user with respect to the interview question set through use of the information stored in the user storage library for the given user.

32. An electronic document generation system as recited in claim 30, wherein the user library storage stores the previously produced customized legal documents for a given user as well as other information previously acquired from the given user, and wherein the document server machine of the electronic document generation system is further configured to remove one or more questions from the interview question set for the selected document template that are to be presented via the user machine through use of the information stored in the user library storage for the given user.

33. A non-transitory computer readable medium including at least computer program code for producing a customized electronic document, said computer readable medium comprising:
computer program code for receiving a customization request for an electronic document, the customization request including or associating to document data;
computer program code for determining a template document for the electronic document based on the document data, the template document being determined from a plurality of available template documents;
computer program code for obtaining a question set that is predetermined and associated with but separate from the template document;
computer program code for receiving responses to the question set;
computer program code for producing a customized electronic legal document from the template document and the responses to the question set, expert processes are associated with the template document and are implemented by computer program code which when performed controls content and verbiage of at least a portion of the customized electronic legal document being produced; and
computer program code transmitting the customized electronic legal document to the local machine or other machine via a network, after the customized electronic legal document has been produced,
wherein the template document is not provided to the local machine or other machine via the network.

34. A non-transitory computer readable medium as recited in claim 33, wherein the customized electronic legal document is a completed electronic form.

35. A non-transitory computer readable medium as recited in claim 33, wherein the customization request is initiated by a requestor, and
wherein said computer readable medium comprises:
sending the customized electronic legal document to the requestor via the network.

36. A non-transitory computer readable medium as recited in claim 33, wherein the customization request is initiated by a requestor, and wherein the responses to the question set result from answers by the requestor to the question set.

37. A non-transitory computer readable medium as recited in claim 33, wherein different template documents have different ones of the available question sets corresponding thereto.

38. A non-transitory computer readable medium as recited in claim 33, wherein the customized electronic legal document has a non-editable format, such that the customized electronic legal document is useable but not alterable by a recipient.

39. A non-transitory computer readable medium as recited in claim 33,
   wherein the template document pertains to a plurality of different electronic documents, and
   wherein said computer program code for producing produces a set of customized electronic documents from the template document and the responses to the question set.

40. A computer readable medium as recited in claim 33,
   wherein the template document to be customized corresponds to a document package, and
   wherein the expert processes operate to produce a plurality of related customized legal documents based on the document package and the answers.

41. A computer readable medium as recited in claim 40,
   wherein the template document and the question set pertains to a plurality of different electronic legal documents, and
   wherein the computer program code for producing the customized legal document includes at least computer program code for performing one or more of the expert processes to produce the plurality of electronic legal documents from the template document and the answers to the question set, the plurality of different electronic legal documents including at least the customized electronic legal document and another customized electronic legal document.

42. A computer readable medium as recited in claim 41, wherein at least one the answers are used to select from available alternative portions associated with the template document.

43. A computer readable medium as recited in claim 41, wherein, due to predetermined associations, the determination of the template document not only selects the template document from the plurality of available template documents but also identifies the question set for the template document that is to be retrieved and also the expert processes for use with the template document.

44. A computer readable medium as recited in claim 33, due to predetermined associations, the determination of the template document not only selects the template document from the plurality of available template documents but also identifies the question set for the template document that is to be retrieved and also the expert processes for use with the template document.

45. A computer readable medium as recited in claim 44,
   wherein the template document to be customized corresponds to a document package, and
   wherein the expert processes operate to produce a plurality of related customized legal documents based on the document package and the answers.

46. A computer readable medium as recited in claim 45,
   wherein the template document and the question set pertains to a plurality of different electronic legal documents, and
   wherein the computer program code for producing the customized legal document includes at least computer program code for performing one or more of the expert processes to produce the plurality of electronic legal documents from the template document and the answers to the question set, the plurality of different electronic legal documents including at least the customized electronic legal document and another customized electronic legal document.

* * * * *